United States Patent
Wild et al.

(10) Patent No.: US 9,956,878 B2
(45) Date of Patent: May 1, 2018

(54) USER INTERFACE AND METHOD FOR SIGNALING A 3D-POSITION OF AN INPUT MEANS IN THE DETECTION OF GESTURES

(71) Applicant: VOLKSWAGEN AKTIENGESELLSCHAFT, Wolfsburg (DE)

(72) Inventors: Holger Wild, Berlin (DE); Mark Peter Czelnik, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days. days.

(21) Appl. No.: 15/124,291

(22) PCT Filed: Mar. 7, 2014

(86) PCT No.: PCT/EP2014/054447
§ 371 (c)(1),
(2) Date: Sep. 7, 2016

(87) PCT Pub. No.: WO2015/131953
PCT Pub. Date: Sep. 11, 2015

(65) Prior Publication Data
US 2017/0021728 A1    Jan. 26, 2017

(51) Int. Cl.
*B60K 37/06* (2006.01)
*G06F 3/01* (2006.01)
*G06F 3/0484* (2013.01)
*G06F 3/0487* (2013.01)

(52) U.S. Cl.
CPC ............ *B60K 37/06* (2013.01); *G06F 3/017* (2013.01); *B60K 2350/1052* (2013.01); *G06F 3/0487* (2013.01); *G06F 3/04845* (2013.01)

(58) Field of Classification Search
None
See application file for complete search history.

(56) References Cited

U.S. PATENT DOCUMENTS

| | | | |
|---|---|---|---|
| 8,760,432 | B2 | 6/2014 | Jira et al. |
| 2008/0005703 | A1 | 1/2008 | Radivojevic et al. |
| 2012/0119991 | A1 | 5/2012 | Tsai et al. |
| 2013/0141327 | A1 | 6/2013 | Wei et al. |

(Continued)

FOREIGN PATENT DOCUMENTS

| | | |
|---|---|---|
| CN | 102135856 A | 7/2011 |
| CN | 103135753 A | 6/2013 |

(Continued)

OTHER PUBLICATIONS

International Search Report, dated Nov. 5, 2014, issued in corresponding International Application No. PCT/EP2014/054447 (English-language translation).

(Continued)

*Primary Examiner* — Kenneth B Lee, Jr.
(74) *Attorney, Agent, or Firm* — Andrews Kurth Kenyon LLP

(57) ABSTRACT

In a user interface and to a method for signaling a position of an input mechanism with respect to an area for 3D gesture detection for a user interface, the method includes the following steps: input mechanism of a user are detected in the area for 3D gesture detection, and the position of the input mechanism is signaled by an indicator in the area of the edge of a display unit of the user interface.

17 Claims, 11 Drawing Sheets

(56) References Cited

U.S. PATENT DOCUMENTS

| | | | |
|---|---|---|---|
| 2013/0141362 A1 | 6/2013 | Asanuma | |
| 2013/0278503 A1 | 10/2013 | Hirata | |
| 2014/0358368 A1 | 12/2014 | Entenmann et al. | |
| 2016/0170491 A1* | 6/2016 | Jung | G06F 3/0488 |
| | | | 715/856 |
| 2016/0357262 A1* | 12/2016 | Ansari | G06F 3/017 |

FOREIGN PATENT DOCUMENTS

| | | |
|---|---|---|
| CN | 103282859 A | 9/2013 |
| DE | 10 2011 053 449 | 3/2012 |
| DE | 10 2011 112 565 A1 | 3/2013 |
| DE | 10 2012 000 201 | 7/2013 |
| KR | 10-2009-0029816 A | 3/2009 |
| KR | 10-2013-0103267 A | 9/2013 |

OTHER PUBLICATIONS

International Preliminary Report on Patentability, dated Sep. 13, 2016 in International Application No. PCT/EP2014/054447. (English-language translation).

* cited by examiner

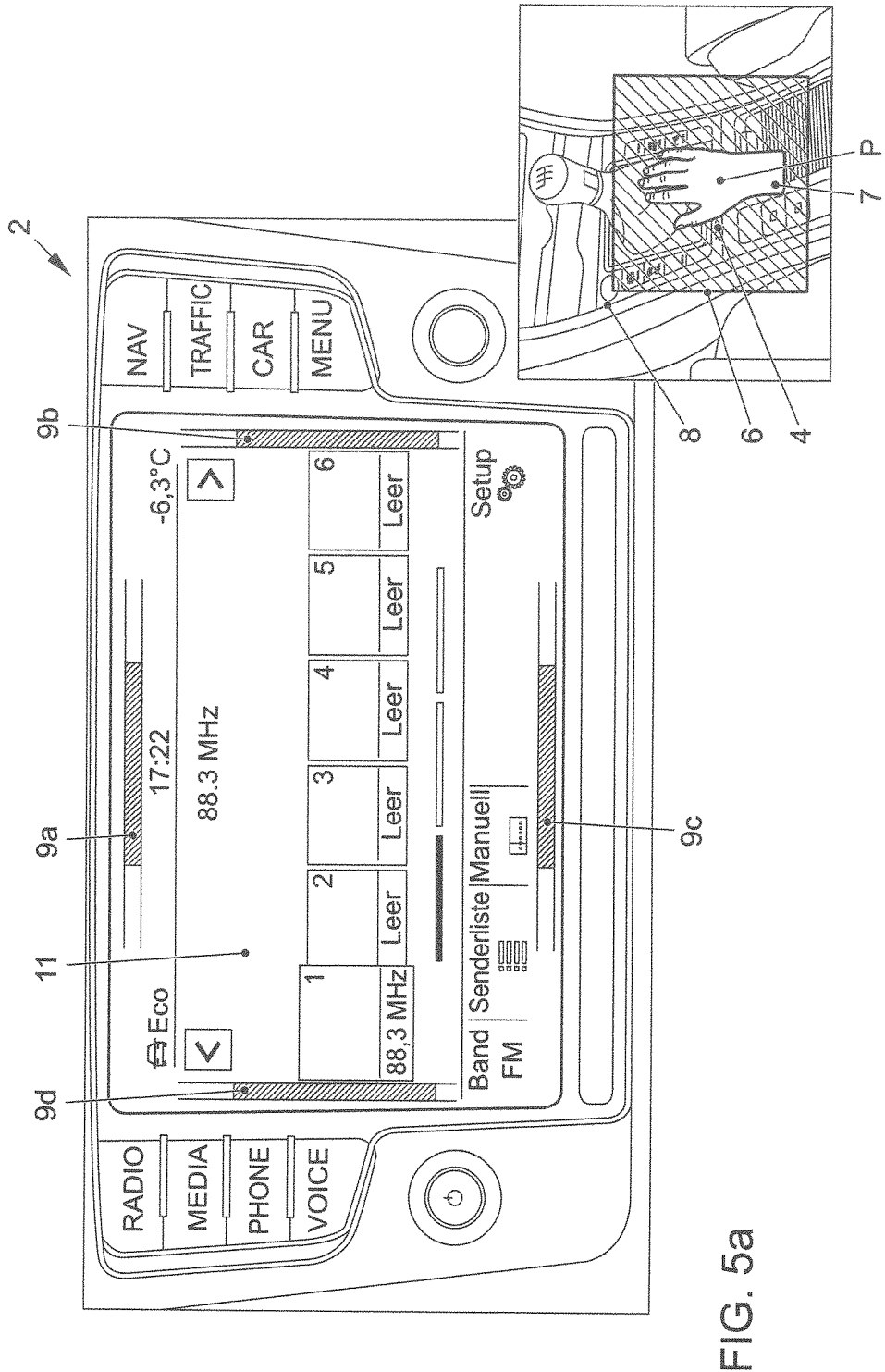

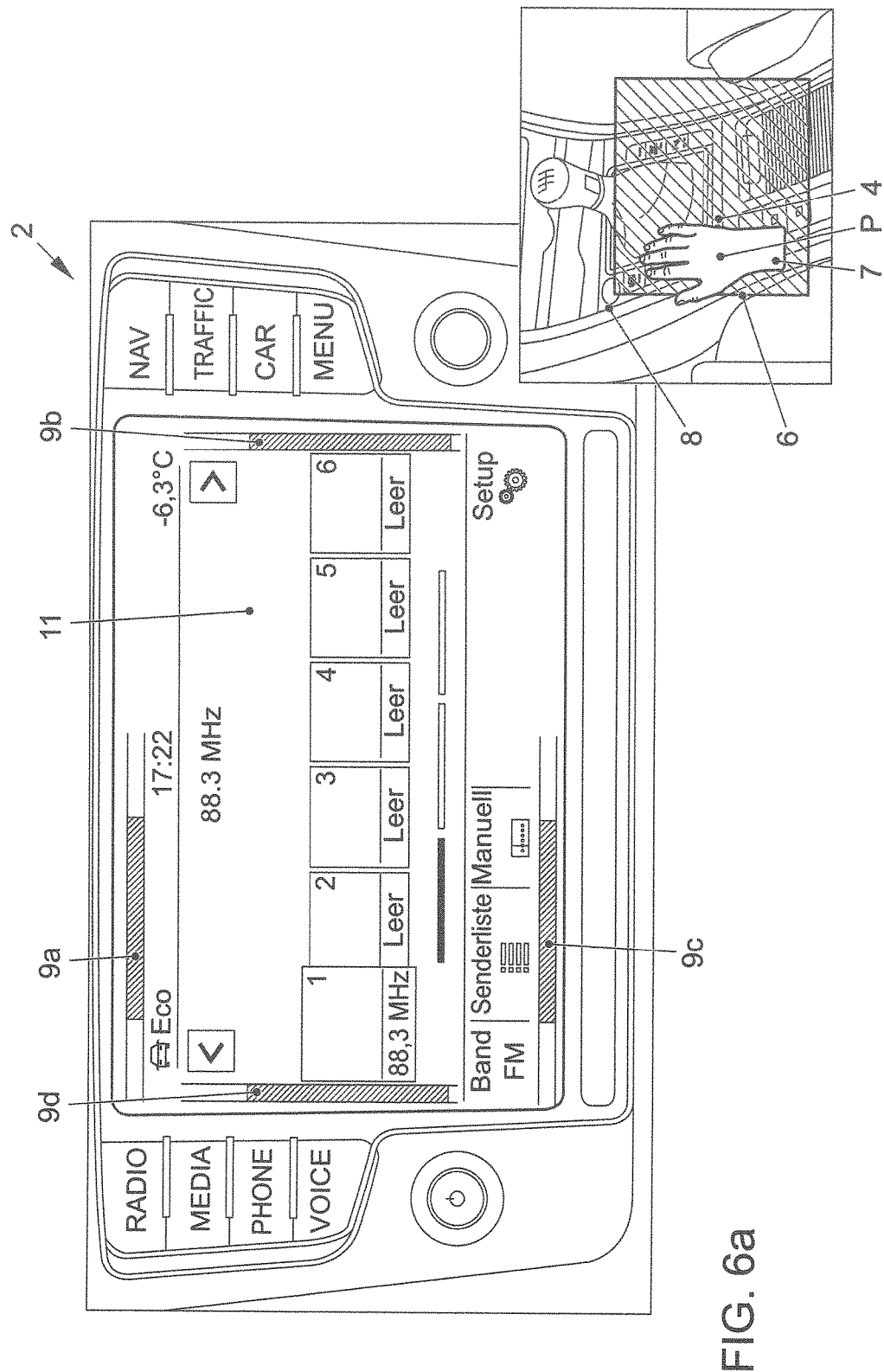

USER INTERFACE AND METHOD FOR SIGNALING A 3D-POSITION OF AN INPUT MEANS IN THE DETECTION OF GESTURES

FIELD OF THE INVENTION

The present invention relates to a user interface and to a method for signaling a position of an input means in relation to a region for the detection of 3D-gestures. In particular, the present invention relates to the possibility of accelerating the learning process of the user with regard to the boundaries of a 3D-region for a gesture-based operation.

BACKGROUND INFORMATION

The 3D gesture-based operation is growing in popularity for user interfaces of mobile terminals and means of locomotion. The sensor used for detecting the input means (such as the hand of a user) has only a limited detection range. The user must execute the gesture within the detection range in order to ensure that the gesture is able to be detected correctly. If the user's hand strays from the detection range, only incomplete data will be available to the system for interpreting and classifying the executed gesture. A fault-free detection is no longer ensured in such a case. While a cursor in the form of an arrow, which is superimposed onto the screen content, has become the predominant means for representing a 2D-input means (for instance a mouse), such cursor displays can be used only to a limited extent for the 3D-gesture-based operation and, depending on the application case, are also not desirable for optical reasons. The representation of a third dimension, in particular, is impossible when using conventional cursors.

German Published Patent Application No. 10 2011 053 449 describes a gesture-based man-machine interface for vehicles, in which user gestures directed at a display element are detected. It is proposed to present a visual symbol or a pointer on the display in order to supply the user with a visual indication of the position of the current input focus in an input. In addition, proposals are made by which buttons selected by gesture inputs can be highlighted in comparison to other screen content.

German Published Patent Application No. 10 2012 000 201 describes methods and devices for zooming functionalities displayed on a display unit of a vehicle using gestures executed in three-dimensional space. To train the user for the gesture-based operation of the device, the display of a window on a display is proposed that indicates a detection of a first predefined gesture. The window furthermore displays operating directions for additional inputs.

SUMMARY

Example embodiments of the present invention better utilize the technical possibilities for signaling a position of an input means in a 3D gesture-based operation.

According to an example embodiment of the present invention, the method is used for signaling a current position of an input mechanism in relation to a region for a 3D-gesture detection for a user interface. The user interface, for example, may be provided in a portable electronic terminal (such as a wireless communications unit) or in a locomotion device. In a first step, the input mechanism of the user is detected in the region for the 3D-detection of gestures. In practical applications, the input mechanism will most likely be the hand of the user. The 3D-gesture detection region is a space that, in particular, does not coincide with a surface of a display unit. In a second step, the position of the input mechanism is signaled by information in the region of the edges of a display unit of the user interface. For example, the display unit could be a screen (also referred to as touch screen in connection with a touch-sensitive surface) on which optional content concerning different functionalities may be displayed. Such screens are usually rectangular, so that the edges of the screen form the edges of the display unit. However, the "region of the edges" extends beyond a region on the display unit. For example, it is also possible to use illumination devices/display units disposed outside the surface of the display unit for displaying the information. Such separate elements may be omitted if the outer regions of the display unit itself (i.e., pixels in the edge region) are used for displaying the information. Example embodiments of the present invention provide the advantage that the optically not directly detectable 3D region for the detection of gestures is visualized indirectly. This makes it possible to teach the user the spatial region that may be used for the gesture detection, provided the user wishes such training, or especially, if a repeated operation in the edge region or outside the boundaries of the gesture-detection region has taken place, and/or if a minimum time has not elapsed yet since the beginning of the 3D-gesture operation. Faulty operations and increased computational work for detecting gestures are avoidable in this manner. In addition, a more reliable detection of gestures ultimately allows the user an earlier return to other tasks (such as the operation of a means of locomotion).

A change in the position of the input mechanism with respect to a first coordinate (e.g., a horizontal line in relation to the display unit) may be detectable, and a position of the information in the region of the horizontal edges of the display unit can be modified in response. In other words, the information in the edge region is able to be modified in accordance with the change in position of the input mechanism. This makes it possible to generate a signature of (imaginary) cross hairs for the position of the input mechanism, at least with regard to two coordinates or space dimension, which offers an orientation via the relative position between input mechanism and the 3D gesture detection region in the edge regions of the display unit.

Accordingly, a change in position of the input mechanism with respect to a second coordinate (e.g., a vertical line in relation to the display unit) is detectable and the position of the information in the region of vertical edges of the display unit can be modified in response. The two aforementioned coordinates may thus be positioned perpendicular to each other, for example, and be plotted in a plane of the display unit.

To visualize a change in position of the input mechanism with regard to a third coordinate (e.g., in the direction of the surface of the display unit and/or in the direction of a sensor used for detecting gestures), no coordinate will then be available anymore when using a 2D-display unit. According to example embodiments of the present invention, a design of the information is therefore modified, which may pertain to, for example, a transparency and/or extension ("length") along the respective edge and/or an edge focus and/or a color design of the information. Also possible, for instance, is a change in form to illustrate a required positional change to a more optimal detection region. To do so, it is also possible to use pictograms (in the form of numerals or symbols as distance indicators). As an alternative or in addition, an output in text form is possible in order to suggest to the user the change in the current position of the user's hand.

For example, the position of the information concerning the boundaries of the edges ("corners") of the display unit essentially correlate with a corresponding position of the input mechanism in relation to boundaries of the region for 3D-gesture detection defined by the sensor used. For example, if the sensor defines a gesture detection region that tapers in the direction of the sensor, then the edge length of the display unit can be scaled to the edge length of the region for 3D-gesture detection, such that the edges of the detection region that extend at a right angle to the distance are always imaged to the complete length of the corresponding edges of the display unit as a function of a current distance from the sensor. For the purpose of reliable gesture detection, the detection region signaled by the information may of course be slightly smaller than the actual spatial region set up for the gesture detection. This difference, for example, may be configured in the form of an absolute offset or in the manner of a percentage offset. In the former development, easily learnable feedback results for the user to the effect that when coming closer to the employed sensor, a wiping gesture causes a more rapid change in the information, which is also implemented within larger limits, than a wiping gesture that is executed at a greater distance from the sensor.

If different persons are meant to operate the user interface, a change in the person of the user is detectable in addition, whereupon the form of the information is modified. For example, following the 3D gesture-based operation by a driver of a vehicle equipped as described herein, the passenger can operate the user interface by introducing his or her hand into the 3D-gesture detection region. Once this change has been detected, optical feedback is able to be output to the (potential) user of the user interface in that, for example, the change in the person of the user is acknowledged by the color of the information and/or a change in form (for example in connection with a pictogram as a symbol for a driver or passenger).

The basic activation of the 3D-gesture-based operation may take place according to conventional mechanisms. The information displayed in response may also be developed in the form of four indicators, whose form/color characteristics feature a region of higher transparency toward the ends. For example, the indicators on the display are shifted in a contact-analog manner with the hand position in the sensor detection region. The relative horizontal position of the hand in the sensor detection region can be represented via the relative position of the upper and lower information. The relative vertical position of the hand in the sensor detection region is displayable via the relative position of the lateral information. The relative third position ("depth") of the hand in the sensor detection region, for example, may take the form of a transparency modification of the information. If the hand has reached what is known as the "sweet spot" of the detection region with regard to the depth, then the information on the display unit is shown in the conventional form. If the distance of the hand then becomes larger or smaller with respect to the sensor, the transparency of the indicators will be increased, for example, or the edges of the information are shown more blurred in order to signal that the sensor signal is able to be improved.

According to an example embodiment of the present invention, a user interface includes a display unit (such as a screen), a sensor system for detecting 3D-gestures, and an evaluation unit (for instance in the form of an electronic control device having a programmable processor). The sensor system is designed to detect an input mechanism (such as a hand of a user) for a 3D gesture-based control. The evaluation unit is set up for signaling a position of the input mechanism through information provided in the region of the edges of the display unit of the user interface. The sensor system used, for example, may operate optically and/or use infrared signals. In all other respects, the features, the feature combinations, and the resulting advantages are obtained as explained above.

In addition, the user interface may include an illumination device which, for example, includes strip-type illumination elements and extend along an edge of the display unit in each case. As an alternative or in addition, the information is able to be signaled via the additional illumination device. In this manner the full extent of the display unit may be used for the display of alternative content.

According to an example embodiment of the present invention, a computer program product (such as a data memory) is provided, on which instructions are stored that enable the programmable processor (e.g., an evaluation unit of a user interface as described herein) to execute the steps of a method described herein. The computer program product, for example, may be a CD, a DVD, a Blue-Ray disc, a flash memory, a hard drive, a RAM/ROM, a cache, etc.

According to an example embodiment of the present invention, a signal sequence is provided, which represents instructions that enable a programmable processor (for instance an evaluation unit of a user interface described herein) to execute the steps of a method described herein.

According to an example embodiment of the present invention, a user terminal is provided, which, for example, could be arranged as a wireless communications device (such as a mobile telephone, a smartphone, a table PC or similar device). For access to its functionalities, the user terminal includes a user interface, as described in detail above.

According to an example embodiment of the present invention, a locomotion device (such as a passenger car, a commercial vehicle, a truck, a watercraft and/or an airplane) is provided, which is equipped with a user interface as described herein. For example, the display unit may be arranged as an instrument cluster and/or as a central information display and be introduced into the instrument panel of the locomotion device for this purpose. The sensor system, for instance, could include an infrared LED strip in a center console of the locomotion device and/or an optical camera in the head lining of the locomotion device above the center console. The evaluation unit may be arranged as an electronic control unit and be used for other functionalities specific to the means of locomotion in addition.

Further features and aspects of exemplary embodiments of the present invention are described in more detail below with reference to the Figures.

BRIEF DESCRIPTION OF THE DRAWINGS

FIG. 5-FIG. 10 illustrate operating steps when operating a user interface according to an example embodiment of the present invention.

DETAILED DESCRIPTION

Figure 1:
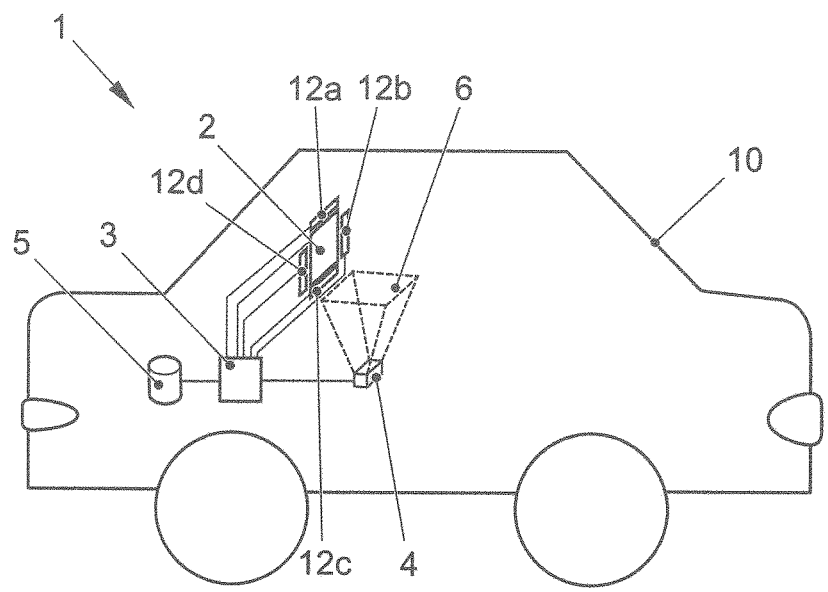
FIG. 1 is a schematic view of components of a user interface in a locomotion device according to an example embodiment of the present invention.

FIG. 1 shows a passenger car 10 as a locomotion device, in which a user interface 1 is installed. A screen 2 as display unit is installed in the instrument panel of passenger car 10 and connected in an IT-supported manner to an electronic control unit 3 as an evaluation unit. Electronic control unit 3 in turn is connected to a data memory 5 where references for classified 3D-gestures intended for operating functionalities of user interface 1 are stored. Mounted underneath screen 2 is an infrared LED strip 4 as a sensor system, which defines a 3D-detection region 6. Illumination elements 12a, 12b, 12c, 12d are situated along the edges of screen 2, via which electronic control unit 3 is able to output information in connection with current hand positions of the user in the region of the edges of screen 2 in order to illustrate a position of an input mechanism (such as a hand of a user).

Figure 2:
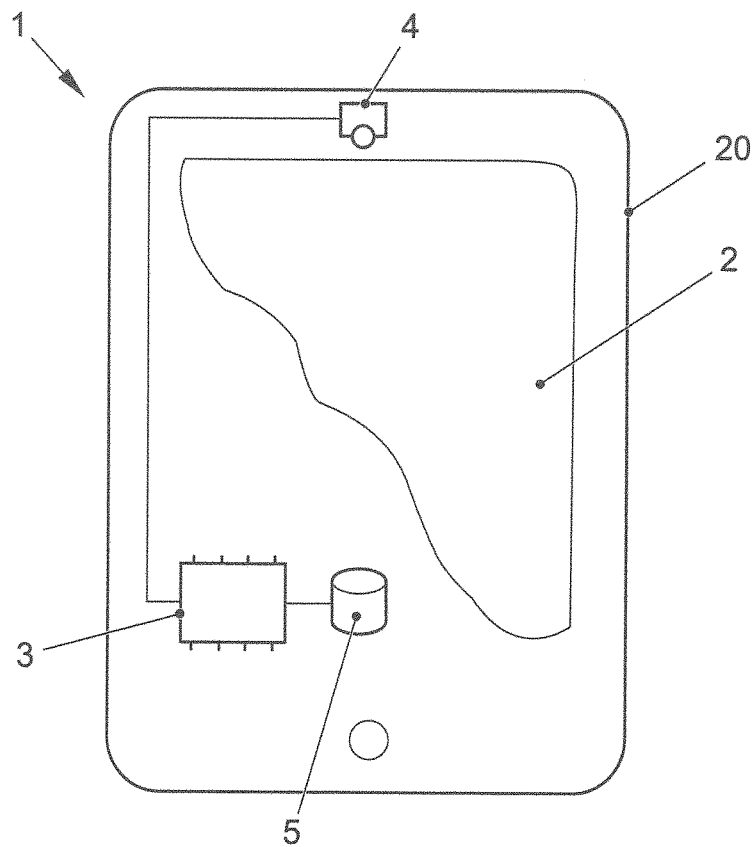
FIG. 2 is a schematic view of components of a user interface of a user terminal according to an example embodiment of the present invention.

FIG. 2 shows a schematic view of a tablet PC 20 as the user terminal, in which a user interface 1 is integrated. An optical camera 4 as a sensor system for the detection of 3D-gestures is connected to a programmable processor 3 in an IT-supported manner. Below the (partially cut open) screen 2 as the display unit there is also a data memory 5, which is connected to processor 3 in an IT-supported manner. The functions of the illustrated components substantially correspond to the functions listed in connection with FIG. 1.

Figure 3:
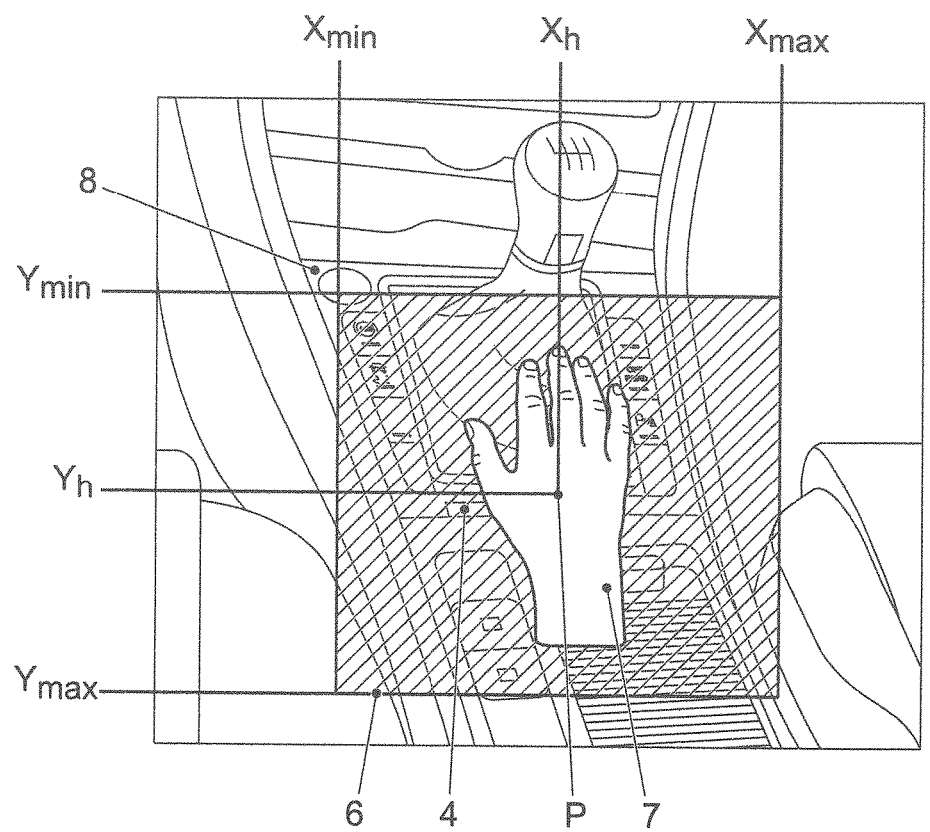
FIG. 3 is a schematic view of a hand of a user in a 3D-gesture detection region.

FIG. 3 shows hand 7 of a user, which is located in a 3D-detection region 6. 3D-detection region is defined by a sensor system 4, which is integrated into center console 8 of a locomotion device. Horizontal boundaries $X_{min}$, $X_{max}$ and vertical boundaries $Y_{min}$, $Y_{max}$ apply to the possibility of a sensor-based detection of hand 7. Current position P of hand 7 is indicated by $X_h$, $Y_h$ inside the aforementioned boundaries $X_{min}$, $X_{max}$, $Y_{min}$, $Y_{max}$. As illustrated, hand 7 is detected in its entirety and can be resolved quite well using sensor technology.

Figure 4:
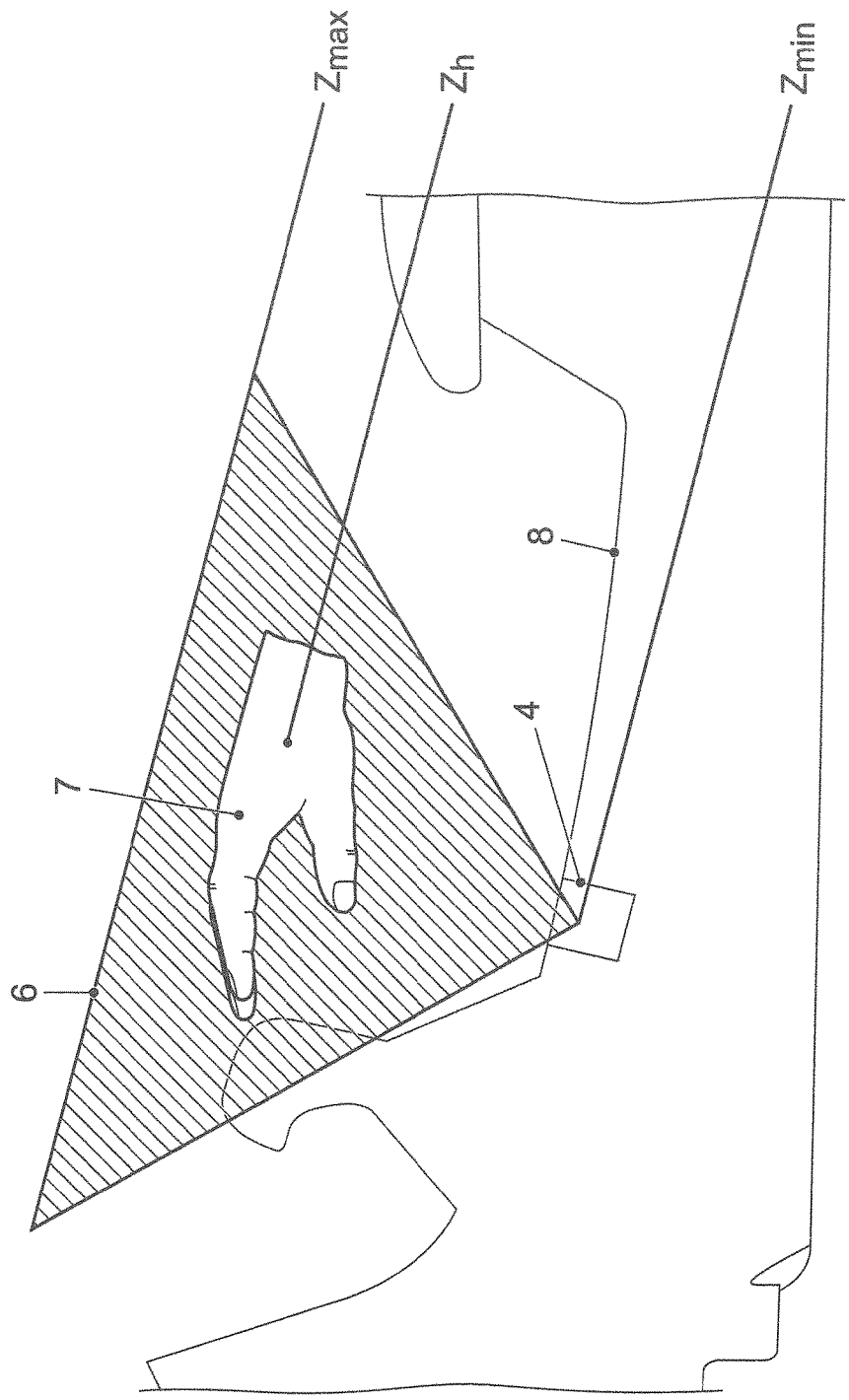
FIG. 4 is an alternative schematic view of a hand of a user in a 3D-gesture detection region.

FIG. 4 shows a lateral view of the system illustrated in FIG. 3. Detection region 6 substantially has the cross-sectional area of an inverted triangle, whose lower corner coincides with sensor 4 integrated into center console 8. Lower boundary $Z_{min}$ of detection region 6 is located here as well. Situated at a distance of approximately 30 to 40 cm from sensor 4 is upper boundary $Z_{max}$ of detection region 6. Hand 7 is disposed between both boundaries $Z_{min}$, $Z_{max}$ at a current height $Z_h$.

In partial Figure a), FIG. 5 shows a view of a screen 2 of a user interface, on which a screen view 11 for the selection of a radio station is displayed. Information in the form of blue bars 9a, 9b, 9c, 9d is shown in the edge regions of screen 2, whose boundaries are characterized by an increasing transparency diffusion in the direction of the corners of screen 2. Partial Figure b) shows a view of a hand 7 of a user in detection region 6 of employed sensor 4, the view corresponding to the view of FIG. 3. Position P of hand 7 lies in the center of detection region 6, and the distance from sensor 4 is selected such that, for one, hand 7 fills detection region 6 quite well, but does not extend beyond its boundaries for another.

FIG. 6 shows an operating step, modified in comparison with the situation shown in FIG. 5 on account of a change in position P of hand 7, in which information 9a, 9c disposed along the horizontal edges of screen 2 has migrated to the left in accordance with position P of hand 7. In contrast, the position of references 9b, 9d along the vertical edges of screen 2 has remained unchanged. The distance of hand 7 with respect to sensor 4 is unchanged as well.

Figures 7A, 7B:
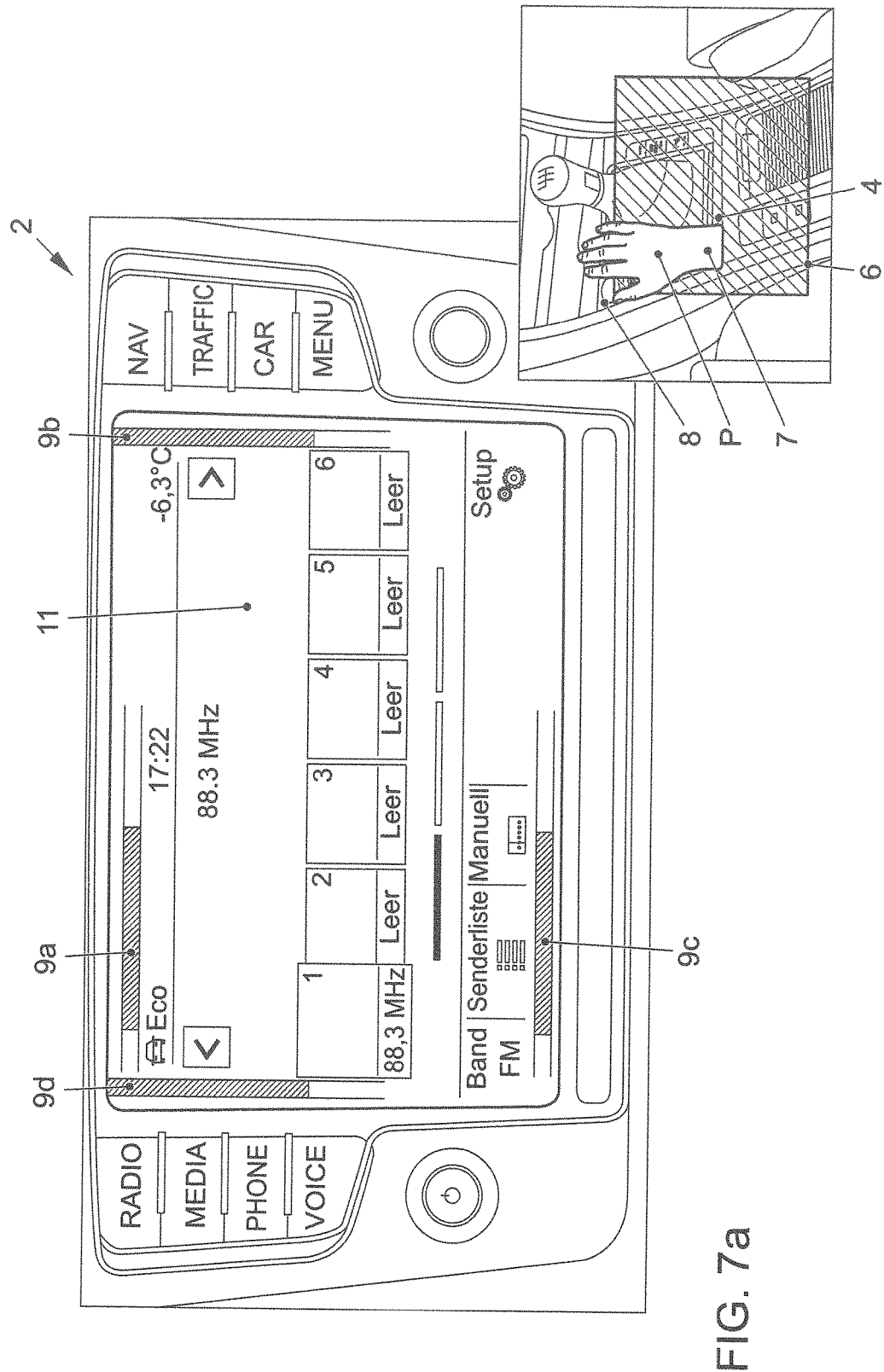

In contrast to the illustration shown in FIG. 6, FIG. 7 shows an additional shift of hand 7 of the user in the upward direction or in the driving direction. Accordingly, references 9b, 9d also have moved along the vertical edges of screen 2 in the direction of the upper edge of screen 2.

FIG. 8 once again shows the situation illustrated in FIG. 5 as the starting point for an effect of a modified distance between hand 7 of the user and sensor 4.

Figure 9:
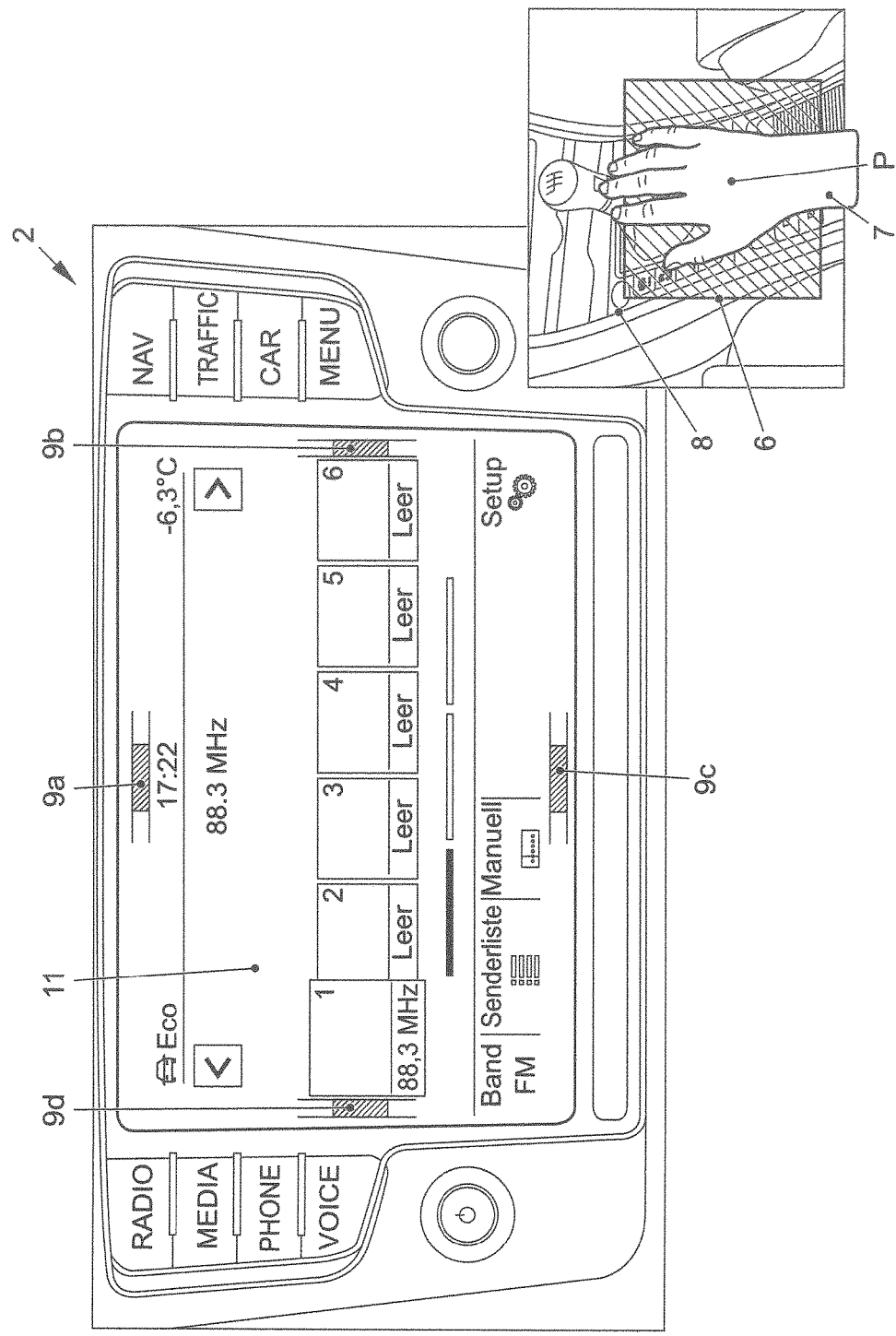

FIG. 9 depicts hand 7 of the user, which is located in an upper edge area of 3D-detection region 6. Hand 7 has been moved in the direction of the viewer, and information 9a, 9b, 9c, 9d in the edge regions of screen 2 is displayed with greater transparency or reduced saturation and luminosity. This informs the user that he should move closer to sensor 4 in order to improve the sensor resolution of his gestures.

Figure 8:
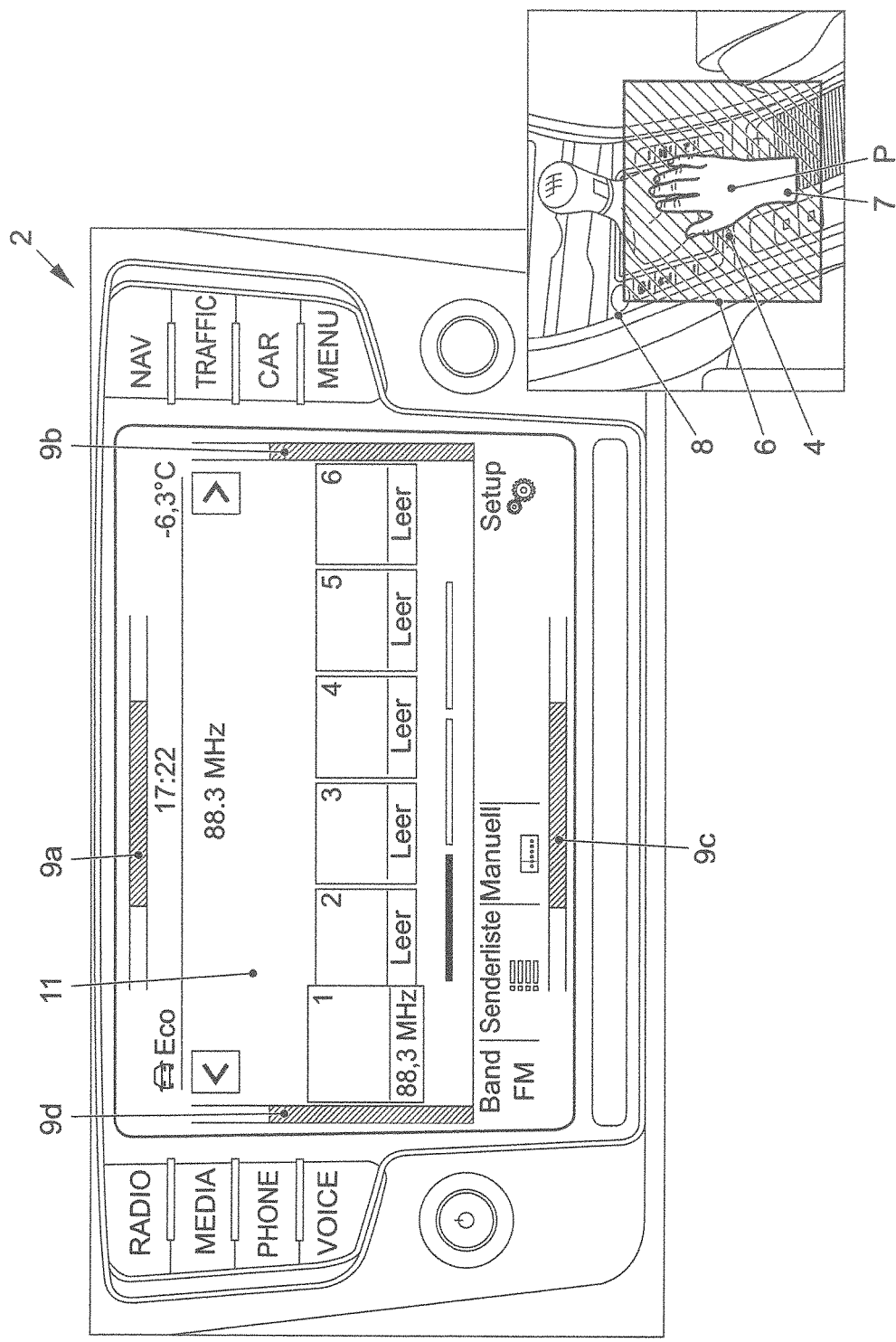
Figure 10:
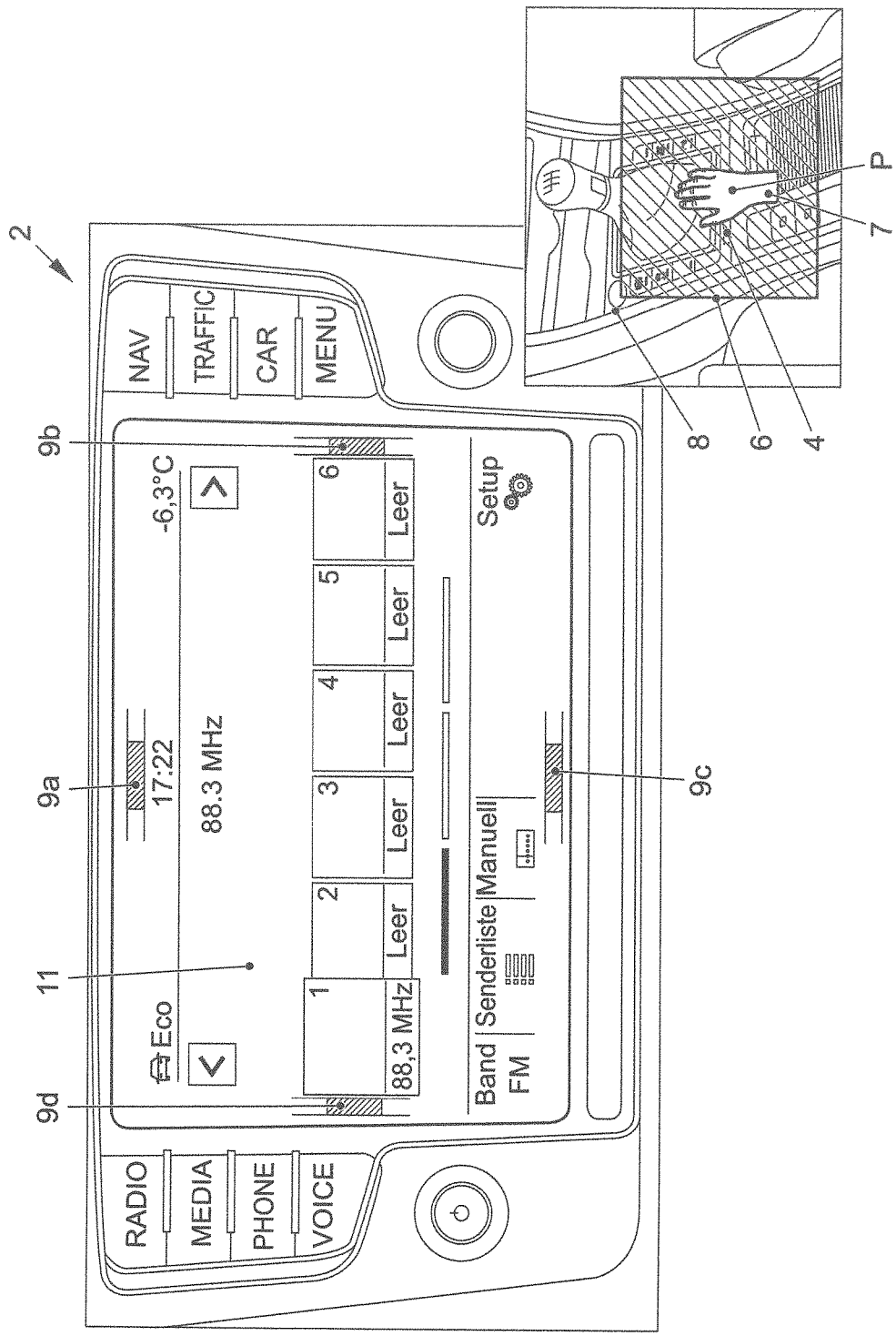

Starting from FIG. 8, FIG. 10 illustrates the result of a disadvantageously close approach of hand 7 to sensor 4. From the point of the viewer, hand 7 has therefore moved into the drawing plane and for this reason is shown at a reduced size. Leaving the "sweet spot" in the direction of sensor 4 according to the situation illustrated in FIG. 9 leads to increased transparency or reduced luminosity and saturation of information 9a, 9b, 9c, 9d. This signals to the user that he should increase the distance between his hand 7 and employed sensor 4 in order to improve the resolution of his gestures.

Figure 11:
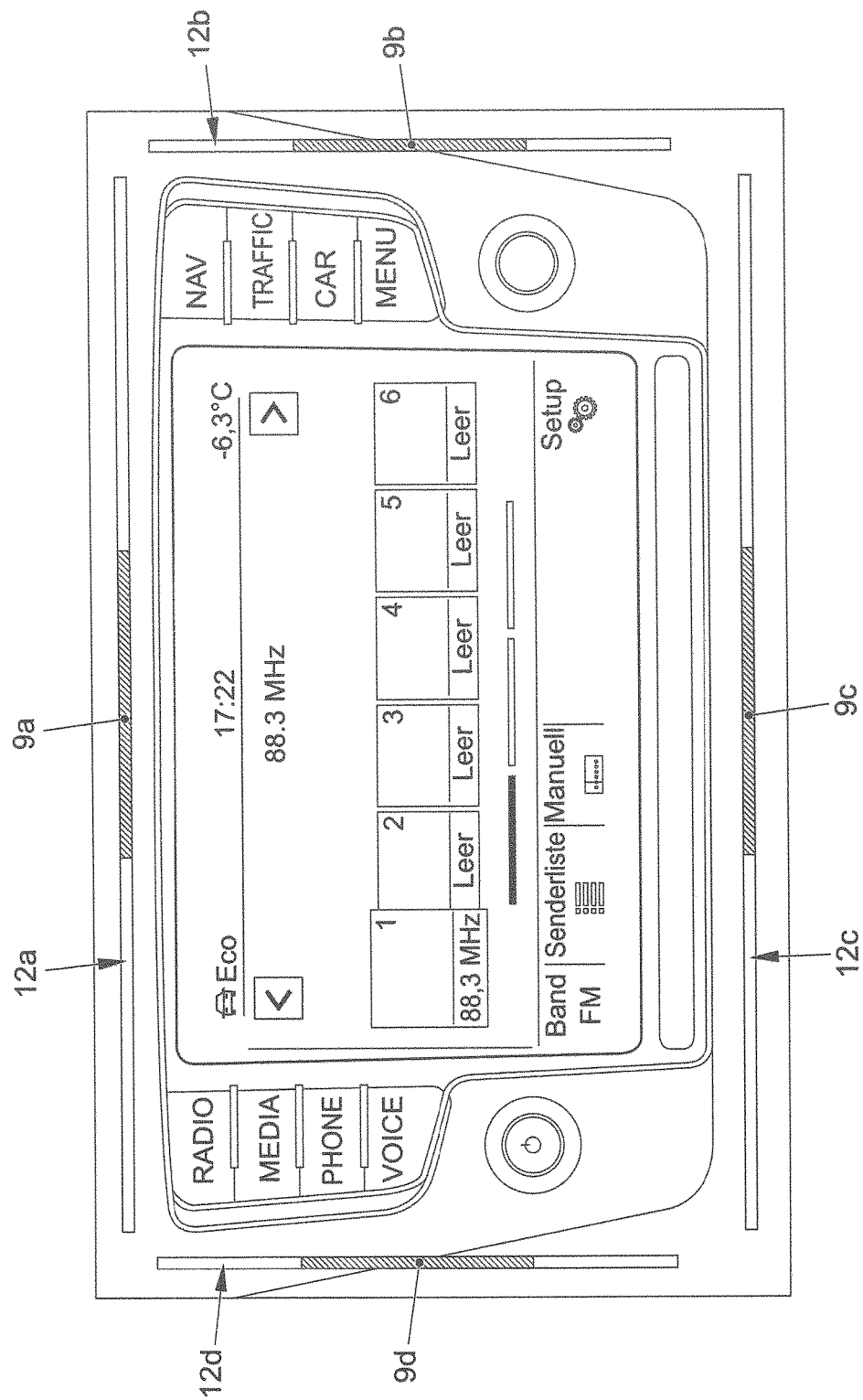
FIG. 11 illustrates a user interface according to an example embodiment of the present invention.

FIG. 11 shows a view of a screen 2, which is surrounded by four additional illumination devices 12a, 12b, 12c, 12d. Two elongated illumination devices 12a, 12c are disposed in the regions of the horizontal edges of screen 2. Accordingly, vertically oriented illumination devices 12b, 12d are situated in the regions of the vertical edges of the screen. Illumination devices 12a, 12b, 12c, 12d are arranged as strip-like illumination elements. To illustrate a position of a hand of a user, illumination devices 12a, 12b, 12c, 12d are designed to indicate information 9a, 9b, 9c, 9d according to the aforementioned comments. Screen 2 may therefore be used for the display of other optional contents in its entirety.

Figure 12:
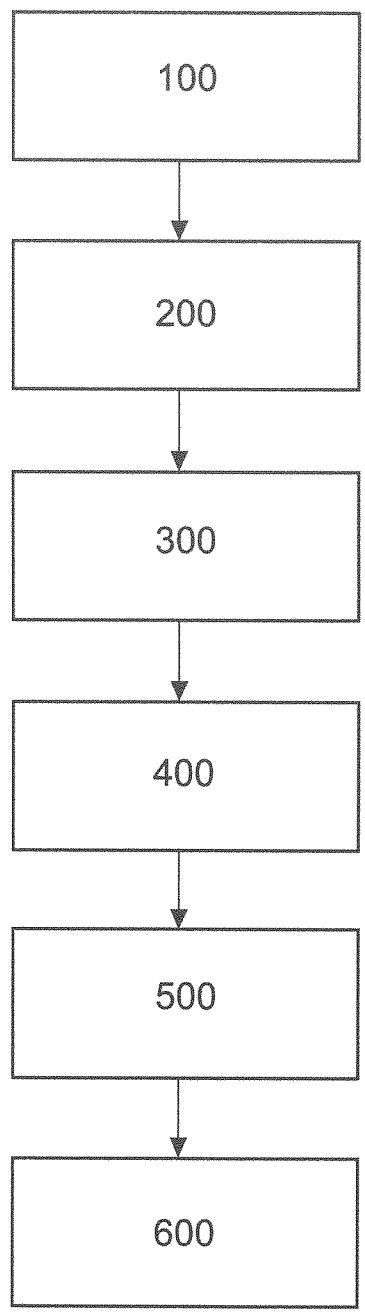
FIG. 12 is a flow chart illustrating steps of a method according to an example embodiment of the present invention.

FIG. 12 shows a flow chart that illustrates steps of a method according to an example embodiment of the present invention. In step 100, the hand of a user as input means is detected in a region for 3D-gesture detection. In order to inform the user about the current position of the input mechanism with regard to the edges of the region for 3D-gesture detection, in step 200, the position of the input mechanism is signaled by an item of information in the region of the edges of a display unit of the user interface. The information may substantially be displayed as bar-type or line-type elements, by which the signature of cross hairs indicating the position of the input mechanism is symbolized in the edge regions of the display. In step 300, the user modifies the position of the input mechanism with regard to three coordinates (horizontal, vertical, and with regard to a third coordinate standing perpendicularly on the two aforementioned coordinates). In response, the position of the information in the region of the edges of the display unit as well as an optical design of the information is modified as well in step 400. With regard to the directions perpendicular to the distance between the hand of the user and the sensor, the position of the information in the edge regions of the display unit is modified accordingly. With regard to the modification in the direction of the distance between the hand of the user and the sensor, the visual design of the information is modified. By leaving the "sweet spot", the transparency of the information is increased more significantly, which results in reduced luminosity and/or saturation of the information in comparison with the other screen contents. As an alternative, it is also possible to provide the edges of the references with more fuzziness, which indicates to the user that a correction of his hand position is advisable. In step 500, a change in the person of the user is detected in that the driver of the locomotion device removes his hand from the detection region, while the hand of his passenger enters the 3D-detection region. This change is acknowledged in step 600 by a change in the visual design of the information. More specifically, the color and the form of the information are modified. In addition, an icon is superimposed in order to illustrate the position of the user currently taken into account by the system. Optionally, it is possible to use previously defined, alternative design parameters or data sets for the changed user persona. For example, it is also possible to provide different lengths for the information display as a function of the capability of the particular user. The driver will usually operate the user interface more frequently, so that the time for the information output may be shorter than for the passenger. Corresponding parameters can be configured as desired in a setting menu.

LIST OF REFERENCE CHARACTERS 1 user interface
2 screen
3 evaluation unit
4 sensor system
5 data memory
6 detection range
7 hand of the user
8 center console
9a, 9b, 9c, 9d information
10 passenger car
11 screen content
12a, 12b, 12c, 12d additional illumination devices
20 tablet PC
100-600 method steps
P; $X_h$, $Y_h$, $Z_h$ position of the hand
$X_{min}$, $Y_{min}$, $Z_{min}$, $X_{max}$, $Y_{max}$, $Z_{max}$ boundaries of the detection region

The invention claimed is:

1. A method for signaling a position of an input mechanism with regard to a region for 3D-detection of gestures for a user interface, comprising:
detecting the input mechanism of a user in the region for 3D-gesture detection; and
signaling the position of the input mechanism by an item of information in a region of edges of a display unit of the user interface.

2. The method according to claim 1, further comprising:
detecting a change in a position of the input mechanism with respect to a first coordinate, and in response thereto:
modifying the position of the information in a region of horizontal edges of the display unit.

3. The method according to claim 1, further comprising:
detecting a change in a position of the input mechanism with respect to a second coordinate, and in response thereto:
modifying the position of the information in a region of vertical edges of the display unit.

4. The method according to claim 1, further comprising:
detecting a change in a position of the input mechanism with respect to a third coordinate, and in response thereto:
modifying a design of the information.

5. The method according to claim 4, wherein the modification of the design of the information relates to transparency, an extension along a respective edge, edge focus, and/or color.

6. The method according to claim 1, wherein the position of the information with respect to boundaries of the edges of the display unit substantially behaves according to a position of the input mechanism with respect to boundaries of the region for 3D-gesture detection.

7. The method according to claim 1, wherein the items of information are displayed on the display unit of the user interface.

8. The method according to claim 1, wherein the items of information are displayed on separate illumination devices next to the display unit of the user interface.

9. The method according to claim 1, further comprising:
detecting the input mechanism of a second user in the region for 3-D gesture detection, and in response thereto:
modifying a design of the items of information.

10. A user interface, comprising:
a display unit;
a sensor system; and
an evaluation unit;
wherein the sensor system is adapted to detect an input mechanism for 3D-gesture control; and
wherein the evaluation unit is adapted to signal a position of the input mechanism by an item of information in a region of edges of the display unit.

11. The user interface according to claim 10, further comprising additional illumination devices and/or bar-type illumination elements, located along respective edges of the display, adapted to signal the items of information.

12. The user interface according to claim 10, wherein the user interface is adapted to perform the method recited in claim 1.

13. A non-transitory computer-readable medium storing a set of instructions that when executed by an evaluation unit of a user interface that includes a display unit, a sensor system, and the evaluation unit, the sensor system adapted to detect an input mechanism for 3D-gesture control, the evaluation unit adapted to signal a position of the input mechanism by an item of information in a region of edges of the display unit, perform the method recited in claim 1.

14. A user terminal, comprising the user interface recited in claim 10.

15. The user terminal according to claim 14, wherein the user terminal is arranged as a wireless communications device, a tablet PC, and/or a smartphone.

16. A transportation device, comprising the user interface recited in claim 10.

17. The transportation device according to claim 16, wherein the transportation device is arranged as a vehicle.

* * * * *